Aug. 1, 1961 B. VODAR 2,994,847
FILM RESISTORS AND METHODS OF MANUFACTURE
Filed May 31, 1955 6 Sheets-Sheet 1

INVENTOR
BORIS VODAR,
BY Laurey and Taylor
ATTORNEYS

INVENTOR
BORIS VODAR,
BY Larson and Taylor
ATTORNEYS

Aug. 1, 1961  B. VODAR  2,994,847
FILM RESISTORS AND METHODS OF MANUFACTURE
Filed May 31, 1955  6 Sheets-Sheet 3

INVENTOR
BORIS VODAR,
BY Larson and Taylor
ATTORNEYS

Aug. 1, 1961  B. VODAR  2,994,847
FILM RESISTORS AND METHODS OF MANUFACTURE
Filed May 31, 1955  6 Sheets-Sheet 4

INVENTOR
BORIS VODAR,
BY Larson and Taylor
ATTORNEYS

Aug. 1, 1961      B. VODAR      2,994,847

FILM RESISTORS AND METHODS OF MANUFACTURE

Filed May 31, 1955      6 Sheets-Sheet 5

INVENTOR

BORIS VODAR,

BY Lawson and Taylor

ATTORNEYS

United States Patent Office 2,994,847
Patented Aug. 1, 1961

2,994,847
FILM RESISTORS AND METHODS OF MANUFACTURE
Boris Vodar, Paris, France, assignor to Centre National de la Recherche Scientifique, Paris, France, a society of France
Filed May 31, 1955, Ser. No. 511,942
Claims priority, application France June 1, 1954
9 Claims. (Cl. 338—308)

The present invention relates to film resistors and its object is to provide such resistors which are of very high quality and in particular very stable, capable of supporting high voltages, of low temperature coefficient and of low voltage coefficient.

The film resistors according to the present invention are chiefly but not exclusively constituted by conductor deposits, mostly metallic, obtained by evaporation in a vacuum and they generally have a high ohmic value. The terms "deposit," "resistor" and "layer" which will be used in the present specification to designate the same structure relate either to the layer alone, or to the whole of the layer, of its electrodes and of its current intakes when the resistor is placed in a vacuum.

Generally, but not exclusively, the thin layer forming the resistor is deposited between two thicker electrodes obtained by the process of reducing in the hot state a colloidal solution or through any other method such as evaporation in a vacuum or cathode atomizing.

I have found that the stability of such resistors depends essentially upon the following factors: structural rigidity of the layers, which is itself dependent upon the mobility of the metal atoms, chemical actions of the gases in contact with the layer, for instance oxidation by said gases, and physical action of these gases which are strongly fixed by the layer and cause the electrical resistance thereof to vary by lowering of the inter-granular potential barriers or in any other way.

It is well known to obtain film resistors by depositing a conductive layer by evaporation in a container, such for instance as a vacuum bell jar, after which the deposit thus obtained is placed in a bulb which is evacuated and sealed. But when this process is used, the residual vacuum in the bulb is generally not very good because it is not possible to heat said bulb to a temperature sufficiently high without injuring the thin layer present therein because this layer, due to the mobility of its atoms, becomes granular at high temperatures and may cease to be conductive.

According to another feature of the present invention, the vacuum in such a bulb is improved by making use of a substance absorbing residual gases, which substance may for instance be a getter of the commercial type. This getter is used for the purpose of increasing the stability of the resistor by reducing the action of the residual gases.

It is pointed out that the possibility of using a getter inside the bulb itself which contains the conductive layer was far from obvious because it could be supposed that evaporation of the active metal of the getter would contaminate the conductive layer. However I found that a getter of the usual type, for instance a barium getter, could be used without any serious drawback. This getter is arranged in such manner that the active metal that is evaporated does not reach the conductive layer. This may be obtained for instance by placing the getter behind a mask which separates it from the conductive layer. In some cases, for instance when there is very little space in the bulb, I make use of a getter giving off but a small amount of metallic vapors or acting without disengagement of such vapors, such for instance as zirconium, columbium, cerium or the commercial product known on the market as "Cetho" getter. Such a use of a getter may be particularly useful in the case of resistors formed in a vacuum bell jar, exposed to the action of air and subsequently sealed in a bulb where the vacuum in the absence of getter is unsatisfactory for the reasons above stated.

The film resistor may be obtained by direct evaporation in an evacuated bulb previously outgased by heating. In this case, the conductive layer is sealed in the bulb without being exposed to the action of air and the vacuum may be very good. However, even in this case, it may be improved by making use of a getter which increases the stability of the deposit.

If a very good vacuum has an excellent behavior under high voltages, a poor vacuum has but a low disruptive voltage. Now film resistors capable of withstanding high voltages are interesting from an industrial point of view for various reasons, such as linearity, stability, possibility of obtaining very high ohmic values, etc. The use of a getter to improve the vacuum according to the present invention will have in this case a twofold effect, that of improving the stability of the resistor and that of making it possible to apply high voltages without failure or without ionization of the residual gases of the bulb containing the thin conductor layer.

Furthermore it will be possible to prepare high voltage resistors with film deposits, even when they are prepared by evaporation in a vacuum bell jar and subsequently exposed to the action of air and finally sealed in vacuum tubes, if these tubes are provided with suitable getters. The vacuum in the tubes, relatively poor before the reaction of the getter, will be considerably improved after this reaction, and there will no longer be any risk of disruption or ionization of the residual gases under high voltages. If the resistor layer is evaporated in a sealed bulb and is not exposed to the action of air, the action of the getter is still important because after the bulb is sealed off, the pressure, which in this case is already very small, will be further lowered by the action of the getter and will be maintained practically without limit of time at a very low value corresponding to a very high disruptive voltage.

In order to increase the stability of the resistance of a thin film deposit, it is essential to prevent the atoms of the deposit from moving. In other words, the deposit must have a structural stability as perfect as possible. This structural stability will depend mostly upon adhesion of the deposit to its support. This adhesion will be achieved by means of an excellent cleaning and a careful outgasing of the support before the deposit is formed thereon. Advantageously, I use for this purpose the conventional ionic cleaning process by discharge in a gas under low pressure, combined with heating at high temperature. However, structural stability depends also upon the physical properties of the metal constituting the deposit and hard metals having a high melting point give deposits of high structural stability. Metals complying with these conditions are generally not inert chemically and the chemical action of the gases on the deposits of metals which are not inert may involve some drawbacks. For instance, the layer may be injured in the course of the exposure of the layer to atmospheric air when the layer is removed from the vacuum bell jar and before it is sealed in the bulb, so that thin deposit resistors made of molybdenum can be obtained by this method only if they are coated with a protective layer, for instance obtained by evaporation of a dielectric before the layer is exposed to the action of air. Another method for obtaining molybdenum deposits consists in direct evaporation in a sealed bulb, so that the layer is never exposed to the action of air, but this method is generally difficult to apply on an industrial scale. Another effect may also have detrimental consequences, to wit a slow evolution of the conductivity of the deposit due to the action of residual gases, even if their pressure is very low in the bulb where the resistor deposit has been sealed. According to my invention, to form the film conductive deposit, I make use of substances which are chemically inert and have a high melting point so as to increase the stability of the resistor formed by the deposit, by eliminating both mobility of the atoms and action of the gases in contact with the deposit.

There are but few conductive substances complying with the above stated conditions. Therefore I preferably constitute thin conductor deposits in the form of layers of iridium or osmium, which metals combine to a remarkable degree the chemical inertia of noble metals with excellent refractory properties. Other examples of refractory bodies which are relatively inert are chromium, cobalt, ruthenium, rhenium, etc.

Thin deposits made of refractory and chemically inert substances will further have the advantages inherent in any deposit of metals having a high melting point. In particular they will combine the advantage of a high stability with that of a low value of the voltage coefficient and they will make it possible to apply, without destruction of the deposit, a stabilizing heat treatment at high temperature, which further increases the structural stability and gives a better final vacuum (which in turn constitutes a further cause of stability).

Experience teaches that for very thin metal deposits, the temperature coefficient of the resistor, which is negative, decreases in absolute value when the thickness increases, then becomes extremely small and subsequently has its sign changed so as to tend toward the high positive values which characterize solid metal. It was found that the voltage coefficient is generally smaller for relatively thick layers having a very low temperature coefficient. Further experiments showed that relatively thick layers also have a better stability and a higher resistance to heating; in particular they are capable of dissipating a higher power by Joule effect. Therefore it is advantageous to reduce the width of the deposits so as to be able to increase their thickness for a given ohmic value. According to my invention, film resistors are made in the form of deposits the width and length of which are chosen in such manner as to obtain the desired ohmic value for a thickness corresponding to a very low temperature coefficient.

For high ohmic values, which are generally the most interesting ones, the deposit will generally be narrow in order to comply with these conditions.

In order to reduce the dimensions of the resistor, and in particular the total length thereof, the deposits according to my invention will be made narrow and sinuous so that the total length will be much greater than the maximum dimension of the resistor. These sinuous deposits will be made preferably such that their self-inductance is as low as possible.

A case which is particularly important in practice is that of film resistors intended to support high voltages, such as used as voltage dividers or for measuring high voltages. In this case, an increase of the thickness of the layer is particularly desirable because the power that is dissipated may be non-negligible and the layer must be capable of supporting this power. I therefore make resistors for high voltages in the form of long and narrow deposits, that is to say having a small dimension in a direction at right angles to the direction of the electric current and parallel to the support. The length of the deposit will be chosen in such manner as to be compatible with the overall dimensions, with the desired ohmic value and power and with conditions of insulation sufficiently remote from disruptive discharge. Generally I make use of a sinuous and long deposit which dissipates a higher amount of power, is more stable, and has a lower temperature coefficient and a lower voltage coefficient.

As the thin conductive layer is generally obtained by evaporation in a vacuum, I will now describe, by way of example, some methods for obtaining narrow and sinuous deposits which may be as long as necessary, in order to obtain film resistors by evaporation in a vacuum, in particular resistors for high voltages.

A first method consists in evaporating the deposits through the apertures of a stencil-like mask of suitable shape which leaves uncovered only a long and sinuous path on the surface of the support where the deposit is to be formed. A resistor having a low self-inductance will be advantageously given a crenellated shape or the shape of a Greek fret forming a continuous line. In this case, the mask is made very easily by engaging in each other two thin metal sheets in which teeth have been cut, the distance between the teeth being greater than the width of the teeth. The advantage of the crenellated shaped deposit is that there are no portions of the deposit close to each other which are at very different potentials, whereby it may be used for very high voltage resistors.

Another method for obtaining a long and sinuous deposit consists in evaporating the material which is to form the deposit onto the support through apertures formed in a mask, which apertures may then be of simple shape, the desired final shape of the deposit being obtained by imparting, during evaporation, a suitable relative displacement of the support with respect to the mask. Owing to this movement, the beams of evaporated atoms limited by the diaphragm or diaphragms act as if they painted on the support the desired deposit to be obtained. For instance, with a mask provided with a single circular diaphragm, it will be possible to obtain an helix-shaped deposit on a cylindrical rod disposed behind the diaphragm and having a translatory axial movement and a uniform movement of rotation. One of the disadvantages of this method is that most of the evaporated metal is not used. By placing in front of the cylindrical rod which constitutes the support a mask provided with a multiplicity of apertures disposed at distances from each other equal to the pitch of the helix to be obtained, this drawback is eliminated. However in this case, it is clear that the mechanical perfection of the displacement and of the positioning of the diaphragms must be the greater as the pitch of the helix is smaller in order to avoid an overlapping of the spires of the helix. A method capable of giving safer results consists in disposing in front of the support, which may be either cylindrical or flat at will, a mask provided with as many apertures as it is desired to obtain spires or waves of the deposit, and in imparting to the support a reciprocating movement of small amplitude in a given direction, whereas the support is given a reciprocating movement in a direction perpendicular to the first mentioned one. Thus, the evaporated atoms passing through each aperture form only one spire or wave or fraction of spire or wave and these deposits are joined together so as to form a continuous deposit. It is thus possible to obtain for instance a crenellated shaped deposit as above referred to. The advantage of the method which consists in imparting combined movements to the mask and the support is that very simple diaphragms such as circular ones are sufficient, so that the width of the deposit which is practically equal to that of the diaphragm may be very small because it is possible mechanically to make diaphragms of very small diameters, such for instance as those used for electronic microscopes.

Another method of obtaining a deposit of crenellated shape for instance consists in making use of grids having a suitable displacement; if the grid is given a reciprocating movement of small amplitude parallel to the direction of one of the lines of the grid when a metal is evaporated through this grid, the deposit that is obtained is in the form of a network of parallel conductive lines distant from one another; it suffices to have all the odd lines for instance stopped before one edge of the grid and all the even lines stopped before the opposite edge to obtain a continuous crenellated line.

The interest of this method is that it is possible in practice to obtain very fine grids by engraving and evaporation methods, which are particularly well adapted to the production of special grids for use according to my invention.

Instead of using diaphragms to limit the beam of evaporated material, I may on the contrary restrict the beam by means of electrical or magnetic fields suitably arranged for this purpose and which act upon the evaporated atoms which have been previously charged electrically. All the known methods of concentration of charged particles will be used in order to obtain a narrow deposit. The known methods will be used for electrically charging the atoms and no auxiliary source of electrons will be necessary for charging the atoms in the case of very refractory metals because they require a very high temperature for their evaporation, at which temperature the electronic emission of the filament itself is already very great.

In the art of engraving on glass, it is well known that it is possible to obtain very fine patterns at a relatively low cost by first engraving the pattern in a layer of varnish or other material deposited on the glass surface, which varnish is subsequently eliminated. An analogous method will be applied according to my invention to obtain long and narrow deposits. For this purpose, I cover the glass surface with a layer of a plastic material for instance, this layer being removed by engraving at the desired places so as to obtain for instance a simple or twofold winding on a cylinder, after which the material to form the deposit is evaporated onto the cylinder thus prepared and the plastic layer is subsequently removed by dissolving or chemical attack. The layer of plastic material may be replaced by an evaporated layer, for instance of fluorine, relatively easy to be engraved, but which is better capable of supporting vacuum in the bulb than a plastic material layer.

Inversely I may effect the engraving on the conductive layer applied on the support and stabilized by a suitable heat treatment, so as to leave this layer only where it is desired. In this case, the layer being generally hard and highly adhesive, engraving by means of a diamond under a well adjusted pressure will be employed. In this way, I may obtain resistors of a value determined with a high accuracy because since the layer is stabilized, the value of its superficial resistivity will no longer undergo any changes. I use for this purpose layers evaporated in a vacuum, for instance layers of refractory and inert metals, or layers obtained by reduction in the hot state, for instance platinum layers obtained from colloidal solutions of platinum. In this case, the engraving will be made before complete reduction, when the layer is relatively little hard but in this case also, engraving in the finished and stabilized layer permits of obtaining a better adjustment of the ohmic value and is therefore to be preferred.

The long, narrow and sinuous resistors obtained through engraving methods are advantageously enclosed in bulbs where an excellent vacuum is formed, if necessary by means of a getter, stability of the resistor being all the more important as the ohmic value has been adjusted with a higher accuracy.

In the case of film resistors which are to dissipate a non-negligible power, a good evacuation of heat toward the surrounding medium is desirable in order to avoid too high a heating of the conductor film and of its insulating support. The chief difficulty comes from the fact that evacuation of heat by means of a gas in contact with the conductor layer is little desirable from the point of view of stability of the layer which is the more stable as it is kept under a higher vacuum. One solution would consist in forming the conductor deposit on the inner surface of an evacuated tube placed in the surrounding medium, but it is difficult to obtain such a deposit by evaporation in a vacuum bell jar. In order to obviate this difficulty and according to the present invention, I proceed as follows: The thin deposit is formed on the external surface of a tube, between the two usual electrodes, and the tube is welded at one of its ends or at both of them inside another tube, the space between the two tubes being evacuated and sealed. Thus, the conductor deposit is kept under a good vacuum and however the glass surface which supports it is in contact with the surrounding medium which fills the inside of the tube which carries the deposit. The electrodes of the conductive thin deposit are made in the usual fashion and the current intakes are for instance welded in the glass of the external tube. This method of manufacture will apply in particular to high voltage resistors when the power is not negligible.

Up to now, I have insisted upon the importance of a high vacuum for obtaining a good stability of thin film resistors. However, the action of gases which cause the resistors to vary may be eliminated otherwise than by the use of high vacuum. It will suffice to coat the resistor in a suitable solid medium, that is to say one impervious to gases and mechcanically stable, so as to avoid any lack of structural stability of the conductor layer. This result may be obtained for instance by coating the deposit with a dielectric protective layer obtained by evaporation in a vacuum. However, in the case of inert and very refractory metals, it is possible to apply a more efficient method which consists in coating the deposit by means of the glass support itself or in welding it inside said glass support. This is possible because the conductor layer is capable of resisting mechanically and chemically to the high temperatures made necessary for carrying out this method. Advantageously I operate as follows: the conductive deposit is made on a flat glass surface; another glass element is placed over the first one and a sufficient pressure is applied to weld in a furnace the two glass elements together. Only the layers formed by the thicker electrodes will project from between the two glass elements between which the thin resistor layer is fully embedded. In order to facilitate the application of this method, I may make use of a quality of glass which is easier to melt than usual so as to facilitate welding of the two glass elements without destroying the film resistor. Such a glass will be deposited for instance in the form of a thin layer of powder, before the two glass elements are brought into contact with each other. According to a modification, the conductor is merely covered with an insulating and gas-tight layer obtained by melting. By way of example, this layer, which must be adhesive, will consist of silver chloride, borax, fusible glass or an enamel having an expansion coefficient adapted to that of the glass support. All methods for coating or welding the layer are of course well adapted to the production of resistors for high voltages and also of resistors for non-negligible powers and will therefore be employed in such cases.

Film resistors are generally stabilized by a heat treatment at a sufficiently high temperature. This stabilizing is an important factor in the manufacture of such resistors. Stabilizing of the structure at high temperature is due to the increased stirring of the atoms which can thus occupy the most stable positions. However, the desired stabilizing is that which permits of filling the empty spaces which constitute the weak spots of the deposit and where most of the resistance is concentrated. Now the usual heat treatment acts upon the deposit in a uniform fashion and the Joule effect obtained with direct current does not act appreciably upon the empty spots through which the current flow is low. According to my invention, a particularly efficient stabilizing treatment consists in applying a high frequency voltage to the film resistor. If necessary, the efficiency of this treatment will be increased by cooling the resistor. Consequently, this method will be applied to obtain very stable film resistors having a reduced temperature coefficient.

It should be readily understood that a high frequency field produces, by dielectric losses for instance, a heating of the empty areas of the layer, where the field is highest, chiefly at low temperatures where conductivity of these empty areas is nearly zero.

Thus the high frequency potential acts exactly on the weak spots of the layer. A potential of 30 volts at a frequency of 30 megacycles per second across the terminals of film resistors of some megohms is sufficient to produce an efficient stabilizing if the layer is maintained at a sufficiently low temperature, for instance that of liquid hydrogen.

The invention is chiefly concerned with thin deposits obtained by evaporation in a vacuum but it applies also to all kinds of film deposits constituting conductors of electricity.

The invention may be applied to a combination of the above mentioned methods.

My invention may be applied to the production of film-like deposits chiefly for using their electrical resistance but it may also make use of their high frequency impedance, their magnetic properties and the variation of their electrical resistance when the temperature varies in order to detect thermal phenomenons.

When a long, narrow and sinuous resistor is obtained as above described by means of a mask, it may happen that this mask must not be in intimate contact with the insulating support on which the deposit is to be formed, this in order to make it possible to measure the electrical resistance of this deposit during the formation thereof. On the other hand, it is very important to obtain a deposit the edges of which are sharply limited because otherwise these edges would be extremely brittle and might involve a lack of stability of the ohmic value of the resistance. Another very important requirement is uniformity of the deposit over its whole length, this uniformity being still more important in the case of resistors which are to withstand high voltages.

According to my invention, I obtain this result by effecting evaporation in a vacuum through a mask from a single evaporator, this evaporator and the insulating support being given a relative movement which ensures uniformity of the deposit. Furthermore, a diaphragm reduces the width of the beam of evaporated atoms in order to ensure a sharp limitation of the edges.

According to the dimensions of the container where the vacuum is formed, it may be easier to impart the desired movement to the support or supports, whereas the evaporator remains stationary or vice versa. Such an arrangement is easier in the case of a container of relatively small dimensions.

Preferred embodiments of my invention will be hereinafter described with reference to the accompanying drawings, given merely by way of example and in which.

Figure 1:
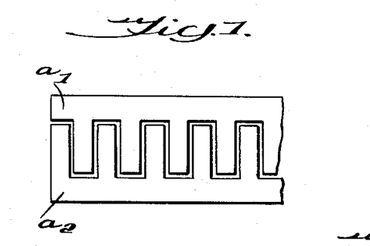
FIG. 1 is a diagrammatic view of a mask for the obtainment of a resistor according to my invention.
Figure 2:
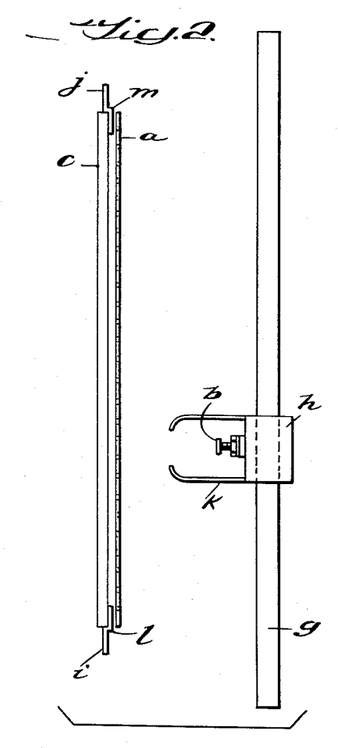
FIG. 2 is an elevational view of an apparatus for producing such a resistor.
Figure 3:
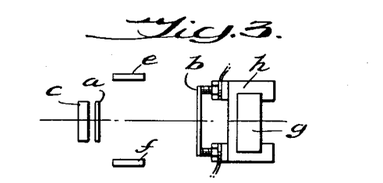
FIG. 3 is an end view corresponding to FIG. 2.

A device for making a resistor according to the invention is illustrated by way of example on FIGS. 1, 2 and 3. Elements $a_1$ and $a_2$ on FIG. 1 are two metal sheets in which teeth have been cut so as to give their edges a crenellated shape, the hollow spaces between teeth being wider than the teeth themselves. When these two sheets are engaged in each other as shown by FIG. 1, they form together a mask uncovering a space in the form of a Greek fret, the uncovered space being for instance from 0.1 to 0.5 mm. wide. The whole of these two metal sheets is designated by $a$ in FIGS. 2 and 3. It is placed opposite the support $c$ on which the conductor deposit is to be formed. This deposit is obtained by evaporation of the conductor substance from the heating element $b$, the whole being placed in a container where a high vacuum is maintained. Evaporator $b$, with its current terminals insulated from each other, is movable along a slideway $g$ where it is supported by a carriage $h$. It is given a reciprocating movement through means which are not visible on the drawing. This slideway $g$ is longer than support $c$ so that the movement of carriage $h$ may be made uniform along the useful portion of its travel, that it to say as long as the evaporator is located opposite support $c$. When the direction of movement of carriage $h$ is reversed, this carriage is not located opposite support $c$. Furthermore, shield $k$ reduces the width of the beam of evaporated atoms. This shield has two functions. Owing to the directive beam it forms, the shadow of mask $a$ is sharp on support $c$ because only the portions of support $c$ which are located opposite evaporator $b$ receive vapors which form the deposit. With distances from the mask to support $c$ averaging some tenths of a millimeter, the edges are thus perfectly sharp. Furthermore shield $k$, when carriage $h$ is at the end of one of its strokes, prevents the evaporated products from condensing on support $c$ where they might form a region of greater thickness.

Another feature of my method is that it permits ionic cleaning of the support before evaporation by an electric discharge and this despite the presence of a mask which leaves only a small width of the support uncovered over the area where the conductive deposit is to be formed. For this purpose, the mask may be retracted by displacing it from the outside of the vacuum bell jar, thus fully clearing the support which is then efficiently cleaned by the discharge. In the example of FIG. 3, mask $a$ undergoes a movement of rotation which takes it away from the space between electrodes $e$ and $f$ which serve to produce the cleaning discharge. In order to obtain a truly efficient discharge, I maintain a relatively low pressure averaging 0.01 mm. of mercury and I apply an alternating voltage averaging 2000 volts between electrodes $e$ and $f$. This discharge is advantageously made to last for about 30 minutes. In these conditions, I obtain a remarkable adhesion of the deposit on the insulating support which is generally made of glass.

When the deposit which is to form the resistor is made of a noble metal, which is chemically inert and has a high melting point, evaporation of such a metal is a delicate problem, due to the high temperature required for this evaporation. According to my invention, this may be obtained as follows. It will be supposed for instance that the noble metal above referred to is iridium, which is both refractory and noble. According to my invention, the heating element is a tungsten strip and the metal to be evaporated is deposited in the form of a powder to constitute a thin uniform layer. The tungsten strip is horizontal and when the metal to be evaporated is melted, it remains in the form of a uniform and thin layer without forming drops or local increases of thickness; the filament is thus heated in a uniform fashion without hot points and an interesting feature is that the tungsten strip cannot break because any alloy as may be formed by the metal to be evaporated with tungsten cannot extend through the thickness of the strip. In the example of FIGS. 2 and 3, $b$ is the tungsten strip and as this strip is to be horizontal the whole of the device is horizontal, i.e. slideway $g$ is horizontal.

Figure 4:
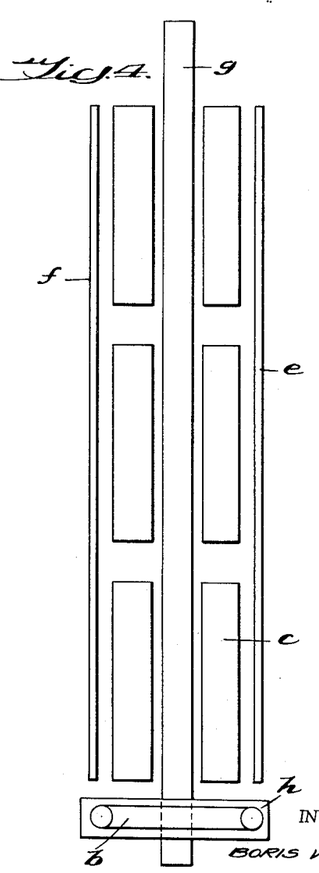
FIG. 4 is a diagrammatical view of a modification of the apparatus of FIGS. 2 and 3.

In order to make simultaneously a plurality of film resistors, I may make use of a single evaporator movable along a slideway so as to deposit metal on several insulating supports, each protected by a mask. Such a method is illustrated by FIG. 4 which shows six insulating plates $c$, for instance of glass, disposed along slideway $g$ on which is movable carriage $h$ which supports evaporator $b$. The cleaning electrodes are shown at $e$ and $f$. The masks have not been shown on this drawing.

When a getter is placed in the evacuated bulb which contains the resistor, it is necessary to provide means for preventing the vapor from the getter from soiling the conductive layer which constitutes the resistor. Furthermore, the getter must not be at the high voltage which is applied to the resistor because, otherwise, discharges might start in the bulb.

Figure 5:
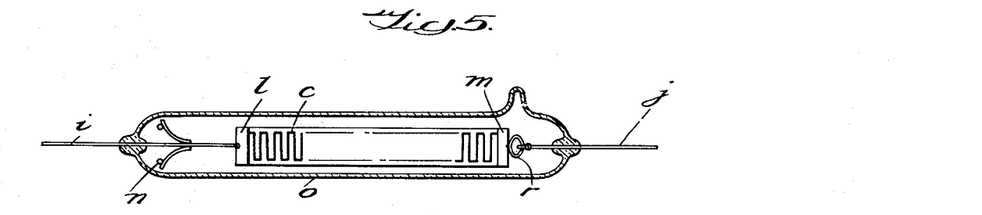
FIGS. 5 to 14 show different embodiments of resistors placed in evacuated bulbs and made according to the invention.

The getter, which is for instance of the conventional barium type, is placed at one of the ends of the evacuated bulb, the side on which barium evaporates being toward the end wall of the tube or bulb. An arrangement of this type is illustrated by FIG. 5. $l$ and $m$ are surfaces metallized by incrustation of silver on platinum under the action of heat, these surfaces acting as electrodes. $i$ and $j$ are the current intakes (these elements $i$ and $j$ are also visible on FIG. 2).

In the construction illustrated by FIG. 5, the barium getter is placed in small tubes fixed at $n$. These tubes are supported by a piece welded to wire $i$. When the flash takes place, the getter is evaporated against the side wall of the tube $o$ and it practically does not deposit on support $c$.

Figure 7:
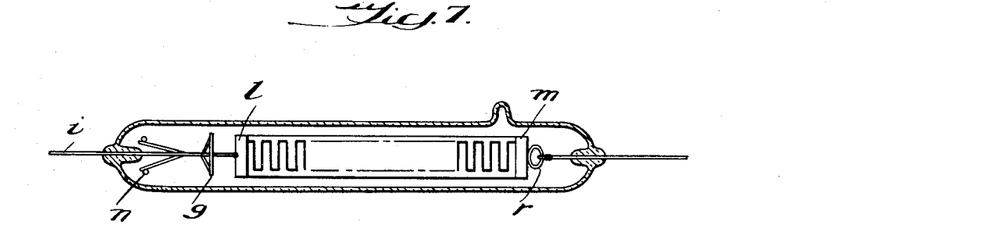
Figure 8:
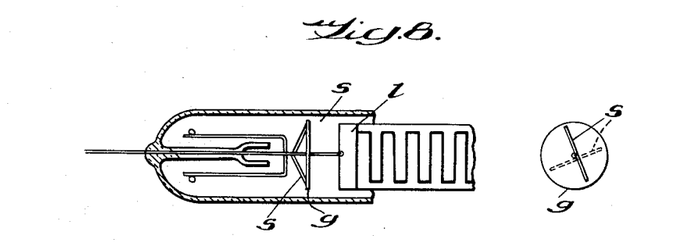

Means may be provided for protecting the resistor against the effects of evaporation of the getter, said means being constituted by a suitable shield. Such arrangements are illustrated by FIGS. 7 and 8. Shield $q$, for instance of mica, is caught between two small rods $s$ fixed to wire $i$ (FIG. 8).

Figure 6:
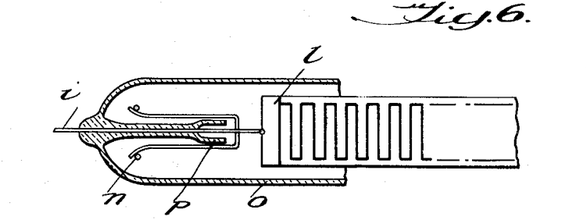

In order to prevent the getter deposit on the envelope of the bulb from being subjected to the voltage applied to the resistor, this deposit must not be in contact with the intake wire. For this purpose, this wire is separated from the getter deposit over a sufficient length. This protection may be obtained in a simple manner by welding the intake wire in a rod $p$ which extends to a limited distance inside the bulb and is provided with a recess at its ends. Such an arrangement is illustrated by FIGS. 6 and 8. The getter vapor cannot penetrate into the recess formed at the end of rod $p$.

When resistors are mounted in an evacuated bulb, some elasticity is necessary, especially when the supporting plate is of a glass different from that of the bulb. For this purpose, the current input wire forms a kind of loop as shown at $r$ on FIGS. 5, 7 and 12.

I found that when very high voltages are applied inside a bulb, even when there is a high vacuum therein, discharges may start inside this bulb if the potentials on the external surface thereof are not well defined. Consequently, in order to obtain high voltage resistors in a vacuum, the external surface of the bulb is kept at well defined potentials, in particular at the potentials of the electrodes, in order to avoid risks of discharges taking place inside this bulb. For this purpose, I fix on the envelope metal covers or hoods, or I metallize the external surface of said envelope by means of a conducting paint or I combine both of these steps.

At very high voltages, it is advantageous to provide a protection of the envelope of the resistor against effluxes or discharges along the external wall thereof. This is especially important if a portion of this envelope is metallized. An efficient protection for this purpose is obtained by means of a varnish or coating made of an organic product of high resistivity, of high disruptive voltage in the mass and which is hydrophobic on its surface. An excellent solution in this case is a varnish or coating made of araldite (an epoxy resin) covered with a silicone varnish.

Figure 9:
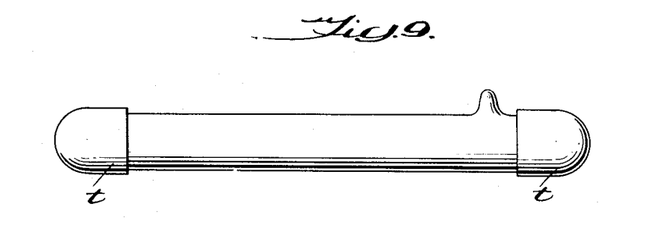
Figure 10:
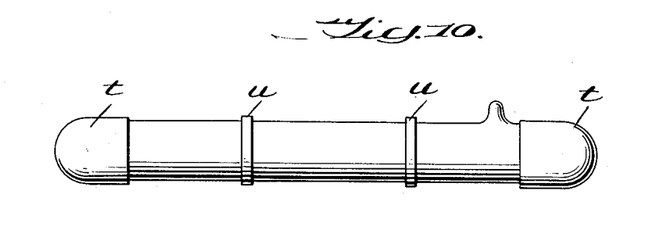
Figure 11:
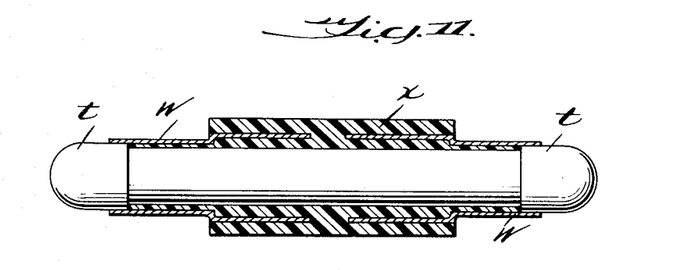

FIG. 9 shows the outside of a high voltage resistor provided at the ends thereof with two rounded hoods $t$ electrically connected with the current outputs and acting as electrodes. FIG. 11 shows a similar resistor but provided with an external metallizing for protection against internal discharges. The metallic hoods $t$ are electrically connected by means of a conducting paint to metal rings $u$ which are rounded so as to avoid concentrations of the electric field. Between rings $u$, for particularly high voltages, the surface of the glass forming the bulb is varnished or coated in araldite in a manner analogous to that of FIG. 11 where the coating is designated by reference numeral $x$.

Figure 12:
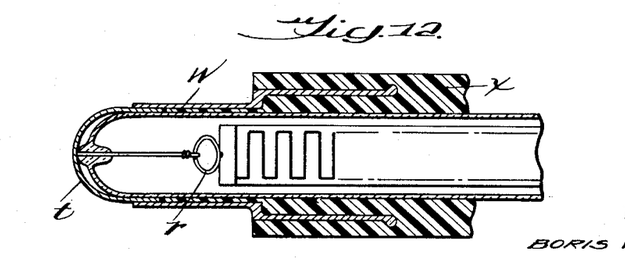

When it is desired to assemble resistors in series so as to subject them to very high voltages, such as 500,000 volts and more, some individual resistors of the chain are brought to extremely high voltages with respect to the earth. In this case, it is useful to provide for a screening of every resistor. In the case of resistors placed in a vacuum, with which the present invention is concerned, this screening is obtained by metallizing such as above mentioned. In order to obtain a satisfactory protection, the smallest possible interval must remain between the two screening elements respectively brought at the potentials of the ends of the resistor. A very good insulation is therefore necessary between the portions of these screening elements located opposite each other because a relatively high difference of potential may exist between these elements. A satisfactory screening and a sufficient insulation are obtained by coating or embedding the respective opposite ends of the screening elements in a very good dielectric such for instance as araldite. In this case, it is preferable to have these elements embedded in the mass of dielectric. In order further to reduce the possibility of effluves taking place and to decrease the space between the screening elements, the ends thereof are given a rounded shape to avoid concentrations of the electric field. FIGS. 11 and 12 show examples of constructions of this kind. For a voltage of 20,000 volts for every resistance, the space between the screening elements may be reduced to some millimeters. $x$ is an araldite coating. The electric connection between the voltage intake $t$ and cylinders $w$ may be obtained by tin soldering or by means of a conductive paint.

In order to give an idea of the importance and of the novelty of the results which may be obtained with my invention, it will be indicated by way of example that it is possible to obtain film resistors under a high vacuum, having values ranging from $10^6$ to $10^9$ ohms for voltages which may be as high as 50,000 volts with a total length averaging 15 cm. These resistors are stable with a variation of less than 1% immediately, i.e. some hours after the application of vacuum in their envelope. Stability under voltage is of the same order of magnitude. After some days of use, a stability of 0.1% is obtained provided that the voltage applied is always much below the maximum voltage that could be applied.

Figure 13:
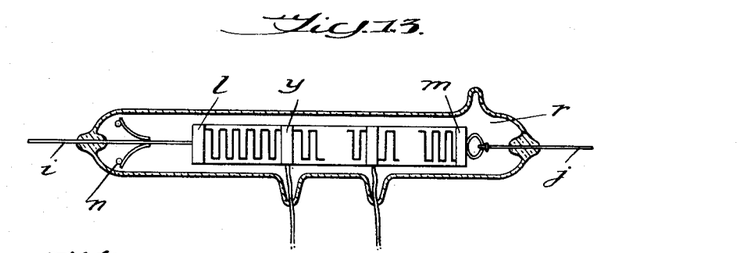

An important application of high voltage electrical resistors according to my invention is their use as high voltage dividers. It may be advantageous to make a voltage divider with a single film resistor contained in an evacuated tube. For this purpose, the metallized electrodes are prepared along the support of the resistor film and these electrodes communicate with the outside of the envelope through wires welded in the glass of the envelope. Such an arrangement is illustrated by FIG. 13. *y* designates one of the intermediate electrodes. *l, m* are the usual end electrodes. All these electrodes are obtained for instance by thermal incrustation of a silver salt deposit or of a platinum salt.

Figure 14:
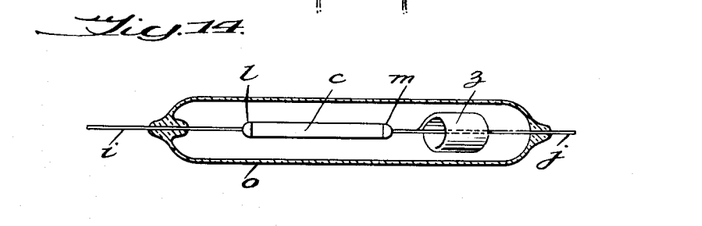

When the tube which contains the resistor is very small, it is difficult to make use of a conventional barium getter because the conductor layer might be soiled by the getter. A non-volatile getter is preferable in this case, such as a zirconium getter or a getter consisting chiefly of cerium and thorium and known on the market as "Cetho" getter. When the getter is a non-volatile one, this getter, in the form of a powder for instance, is placed in a small metallic tube which is either wedged, in contact with the glass tube at one of the ends thereof, or fixed by welding or mechanically on the current intake wire. The last mentioned arrangement avoids contact with glass, which may be undesirable during the period of reaction of the getter. As a matter of fact, during this period the getter is heated by means of high frequency current to a temperature which may be relatively high, and contact with glass may be undesirable. By way of example, FIG. 14 shows on a large scale a resistor including the tube *z* which contains the getter. *c* is the support which receives the deposit, generally a small glass stick, *l* and *m* are the electrodes (which are thicker), *i* and *j* the current intakes. Tube *z* is shown when fixed on wire *j* by welding. Furthermore, it will be noted on FIG. 14 that there is no special nipple. Pumping is ensured axially and the end nipple is closed at the same time as wire *j* is welded to the envelope. Resistors of this type may have a stability much better than 1%, and this in the few hours which follow their manufacture. This stability is obtained if the metal of the deposit is a noble metal and having a very high melting point such as iridium or osmium and if this deposit is made by evaporation under a high vacuum on a clean and polished surface.

Figure 15:
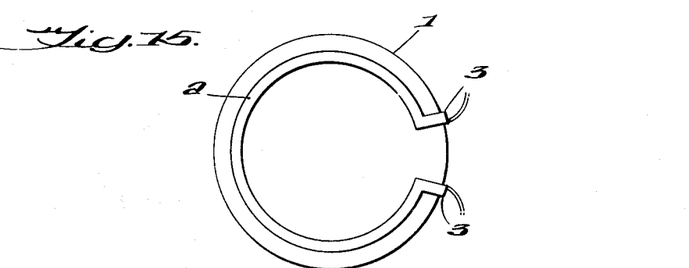
FIG. 15 is a plan view of another kind of resistor according to the invention.
Figure 16:
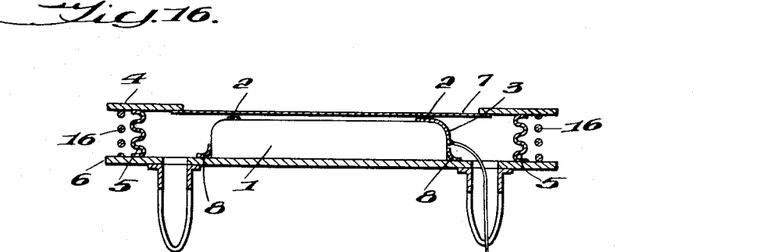
FIG. 16 shows on an enlarged scale a detail of the structure of FIG. 15.

It is possible to obtain a potentiometer or a rheostat of high ohmic value and of good stability with thin metal layers maintained under a vacuum. In order to achieve the movement of the movable contact, the metallic layer on its insulating support is placed under vaccum opposite to, and at a short distance from, a flexible metallic diaphragm. A movable index located in the surrounding air bears upon this diaphragm which is thus in contact with the conductive layer, as the conventional plate in conventional potentiometers. The conductive layer is on the other hand provided with one or two end electrodes which extend from the vacuum space through gas-tight weldings. The flexible diapragm itself or the box which contains the layer and its support act as potentiometric electrodes. An example of such a potentiometer is shown by FIGS. 15 and 16. The film resistor support is a circular disc 1, for instance of glass. 2 is the conductor deposit with the end electrodes 3 which pass to the outside by welding of metal in the glass envelope, as shown for one of these electrodes on FIG. 16. 7 is the metal diaphragm fixed on a more rigid ring 4. 6 is the bottom of the casing in which disc 1 is housed. A vacuum is made around disc 1 by means of a nipple shown on FIG. 16. FIG. 15 shows only disc 1, and not the casing in which it is placed. 5 is a thermostatic pipe of corrugated structure which is compressible so as to permit inclination of diaphragm 7 to ensure its contact with the resistor film 2. 16 is a spring preventing said part 5 from being flattened under the effect of the atmospheric pressure. 8 are means for fixing disc 1.

The film layers as above described are generally metallic but not necessarily so.

Up to now I have been referring to very thin metal layers, that is to say essentially layers the resistivity of which is much higher than that of solid metal. Such very thin layers are generally kept under vacuum.

However I have found that layers which are not so thin, when prepared in the best possible conditions of vacuum and cleanliness of the support, have a stable resistance even when they are not maintained in a vacuum. Such layers may be suitable in the usual dimensions to make resistors of relatively low ohmic values. For higher ohmic values, ranging for instance from 100,000 ohms to 100 megohms, these layers must be made in the form of thin strips which must further be made sinuous if it is desired to obtain small dimensions.

I will now refer to the production and mechanical applications of metallic layers of relative thickness, that is to say of a thickness higher than 100 A. and of superficial resistivity ranging from 10 ohms per sq. cm. to 1000 ohms per sq. cm., these layers being not necessarily kept in a vacuum. When such metal layers are made in accordance with the above given indications and when the thickness is not too small, the hardness and adhesion of the layers may be very high. For instance on a layer of nickel-chromium alloy, a diamond point having 0.03 mm. of length under a load of 20 gr. gives a defective cut after a very short travel. These layers also have a considerable resistance to chemical attack. Thus nickel-chromium layers are passive under the action of hydrochloric acid, even after several hours.

These properties, that is to say the very high mechanical resistance and the chemical inertia of moderately thin layers prepared as above indicated by evaporation under a vacuum, make it possible to use them without protection by a vacuum. These layers have many advantages over deposits formed by the conventional chemical methods (such as thermal incrustation, i.e. reduction in the hot state of a salt of an inert metal such as platinum, gold or silver, or silvering in the cold state). As a matter of fact, even when particular precautions are taken, the two last mentioned methods give only much thicker deposits, thus limiting the ohmic value of the resistors to be obtained. Furthermore, the hardness of such deposits is never comparable to that of layers obtained by evaporation in a vacuum of metals such as chromium.

A first application of moderately thin metal layers which are not kept under vacuum is the production of metallized plates and discs acting as wave guide attenuators and coaxial cable attenuators.

Figure 17:
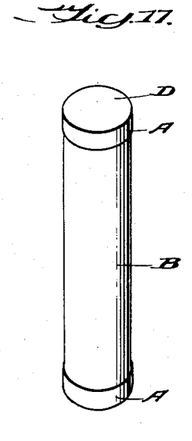
FIGS. 17 and 18 are perspective views of two other embodiments of resistors according to this invention.

Another application is the obtainment of resistors for very high frequency. Such resistors of not very high ohmic value, for instance 75 ohms, are obtained by covering an insulating body with a uniform metal layer between two electrodes. These electrodes are obtained by thermal incrustation of platinum and silver. A cylindrical tube is the form that is generally found preferable for the support of the layer. The self-inductance and capacity are negligible if the dimensions are not too large. With superficial resistivities averaging 500 ohms per sq. cm. these dimensions remain small for the usual ohmic values, for instance 75 ohms. An example of such a resistor on an enlarged scale is shown on FIG. 17. D is the support tube which will be advantageously made of transparent silica because of the dielectric losses. The electrodes are shown at A and the layer acting as a resistor is shown at B.

A very important condition for the obtainment of film-like layers to be used with high frequencies is that the layer must have a very uniform superficial resistivity. Otherwise, apparent distributed capacities are formed at high frequency. I have explained above how it is possible to obtain uniform deposits, even very long ones, owing to a relative movement of the support and of the evaporator, that is to say by scanning the support by a jet from the evaporator which, so to speak, paints the support. This process can be used for forming flat or cylindrical deposits of relatively large thickness to obtain guide wave attenuators or high frequency resistors. For cylindrical deposits, scanning by relative displacement is combined with a rotation of the supporting cylinder.

In order to obtain relatively high ohmic values of the resistors, moderately thin layers must be made in the form of a narrow, long and sinuous strip. Methods for obtaining such deposits have been described hereinabove.

However, moderately thick layers are so strong that they can be handled in air and in contact with chemical agents. In this case, it is often simpler to perform a uniform evaporation without a mask over the whole area of the support and then to engrave the layer so as to give it the form of a long, narrow and sinuous line. I will hereinafter describe a method for engraving moderately thin metal layers obtained chiefly by evaporation in a vacuum. In view of the very great hardness of layers, such for instance as nickel-chromium layers, and of their chemical passivity, the problem of engraving them was a rather difficult one.

Very satisfactory results have been obtained with an engraving method which will be called "varnish process by electro-chemical attack." This method can be summed up as follows: The evaporated metallic layer is covered with one or several protective coatings such as waxes and varnishes, or bichromated gelatin. This coating is subsequently engraved by one of the conventional methods which are adapted to its nature: mechanical engraving or photoengraving. After this treatment, the portions of the metallic layer that have been uncovered are dissolved. For this purpose, I make use of a chemical reagent by activating the reaction by means of nascent hydrogen. This nascent hydrogen can be obtained either by chemical action or by electrolytic action. This last method is more active because in this case the layer is immersed in the reagent and a voltage is applied thereto and the bubbles are disengaged at the very surface of the metal which is to be removed. By way of example, a deposit of nickel-chromium which was not attacked by a bath of hydrochloric acid is immediately dissolved if a negative voltage is applied to the conductive surface. The finest hydrogen bubbles are most favorable to the operation. The attack goes on from one place to the next one when the deposit is gradually immersed into the bath.

Mechanical engraving of the protective coating is particularly suitable in the case of pieces having the shape of bodies of revolution, and in particular of a cylinder on which is traced a simple helix or a double and inverted helix in order to reduce self-inductance. This method requires some precautions in order to prevent the attack from being propagated by infiltration below the coating which has not been removed. Good results are obtained by engraving by means of a diamond a coating made of two superimposed different varnishes, one of which, in contact with the metallic layer, is soft and has the consistency of bee's wax, to make the tracing. The second layer is made of a harder substance such as a varnish applied in the cold state, and keeps the first varnish in position.

Figures 18, 19:
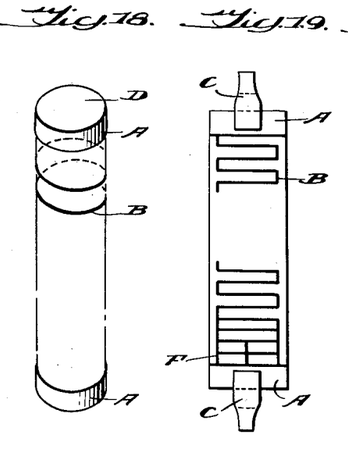
FIGS. 19 and 20 show, respectively in plan view and in side view, a resistor made according to another embodiment of the invention.

For instance, the element shown in FIG. 18 would be made by mechanical engraving on a varnish. The conductor strip B is what remains of the layer after engraving on the varnish and electrochemical attack. As a matter of fact, the pitch of the helix is much smaller than shown. A conductor of the width of some 0.01 mm. with insulating intervals of the same width between the turns can be obtained. A double helix, with propagation of the current in the reverse direction has not been shown. As a matter of fact, such a tracing is preferable from the point of view of self-inductance. It should be added that mechanical engraving is perfectly adapted to the production in series since modern machine tools permit of obtaining engraving of any article in a very short time.

Figure 20:
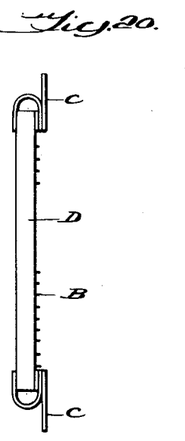
Figure 21:
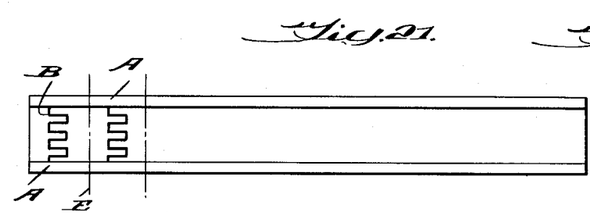
FIGS. 21 and 22 are explanatory views relative to a method of making resistors according to the invention.
Figure 22:
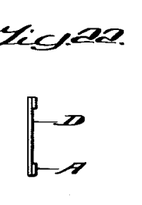

Photographic engraving of the coating is a conventional method which can be applied without special precautions. It is better adapted in the case of deposits which are flat and without symmetry of revolution such as shown on FIGS. 19 and 20. In this case a conductor strip B, folded to form a kind of Greek fret, is produced to reduce self-inductance. The platinum or silver electrodes are shown at A. The current intakes are made by means of a metal sheet folded upon itself, set on electrodes A and soldered with a silver and tin solder. In order to obtain a great number of resistors of this kind at the same time from a layer obtained by evaporation under a vacuum, I first form a uniform deposit in the form of a continuous strip comprised between two electrodes, for instance silvered electrodes extending over the whole length and on either side of this strip. The deposit is then made photo-sensitive and it is engraved by photography by illuminating the portions of the coating which, becoming insoluble, will remain during dissolution in hot water of the non-illuminated areas. By an electro-chemical attack, the non-protected metal is then dissolved. If there is a great number of identical sinuous transparent spaces, I thus obtain a great number of similar resistors from a continuous deposit obtained by a single evaporation. Such a method is illustrated by FIGS. 21 and 22. Electrodes A are previously silvered on a glass support D. This support subsequently receives the uniform deposits by evaporation in a vacuum. Then this deposit is coated with the photo-sensitive layer which is photo-engraved. The metallic deposit is then attacked chemically or preferably electro-chemically and the conductor strips B are obtained, that is to say a great number of resistors identical to FIG. 19. There only remains to separate these resistors from one another by cutting plate B along lines such as E.

Figure 23:
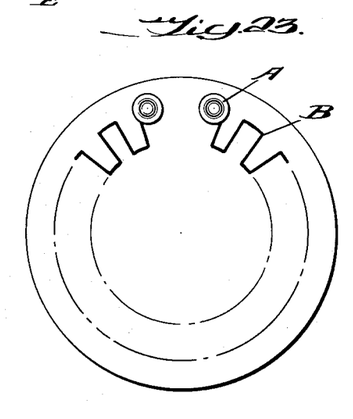
FIGS. 23 and 24 show, respectively in plan view and in cross section, a resistor made according to still another embodiment of the invention.
Figure 24:
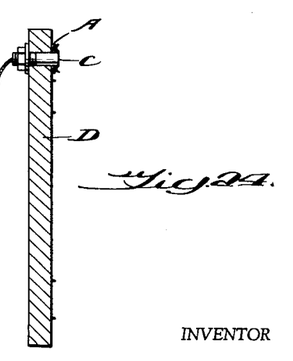

A sinuous deposit on a circular flat plate may also act as a resistor, but it may also serve to the manufacture of a potentiometer. Such a resistor of circular shape, in the form of a Greek fret, is shown by FIGS. 23 and 24. This resistor can easily be obtained by photoengraving and constitutes a potentiometer plate for high ohmic values. If the pitch of the teeth of the deposit is small, a very gradual variation of the resistance may be obtained.

Figure 25:
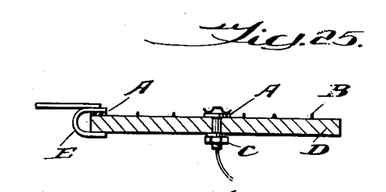
FIGS. 25 and 27 are a cross sectional view and a plan view, respectively, of a resistor according to still another embodiment of the invention.
Figure 26:
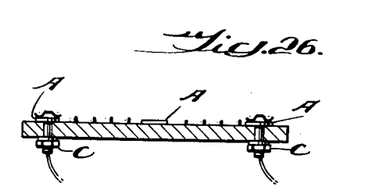
FIGS. 26 and 28 are views, similar to FIGS. 25 and 27 respectively, of still another embodiment of the invention.
Figure 27:
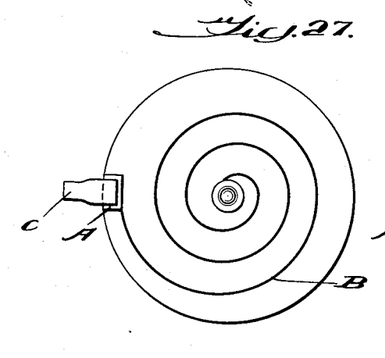
Figure 28:
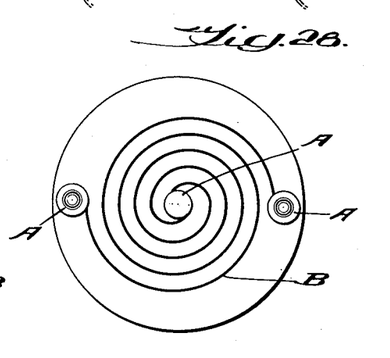

A very interesting form of long, sinuous and narrow film-like resistors is that which is constituted by a thin ribbon forming a spiral on a flat disc (FIGS. 25, 27). With a simple spiral, the length of the conductor strip may be very great but the self-inductance is not compensated for. An inverted double spiral (FIGS. 26, 28) has a much lower self-inductance and the same advantage of length. With such an arrangement, the current starts from the periphery of the disc, follows a spiral travelling toward the centre and returns to the periphery through another spiral similar to the preceding one but turning in the opposed direction. An arrangement which also gives a low self-inductance and which seems to be still more interesting than the preceding one is that where the disc includes two conductor spirals of inverse directions on each of its faces, these two spirals being insulated at the periphery and in electric contact at the centre or inversely. With such an arrangement, the capacity may be further reduced by disposing the two spirals so that they are not opposite each other but on the contrary by disposing them in such a manner that, seen by transparency, they would be engaged in each other. The method including two spirals on the respective faces of a disc is further adapted to the obtainment of resistors for high voltages because the portions of the conductor at very different potentials are separated from each other by the thickness of the disc.

Figure 29:
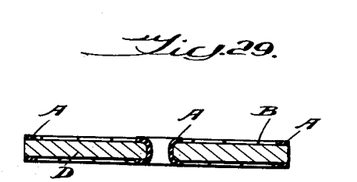
FIGS. 29 and 30 are views, similar to FIGS. 25 and 27 respectively, of still another embodiment of the invention.
Figure 30:
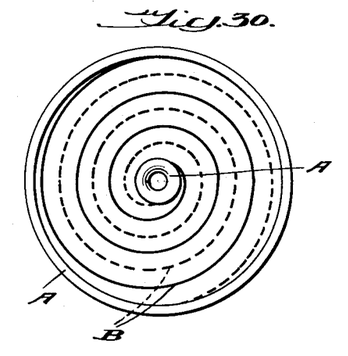
Figure 31:
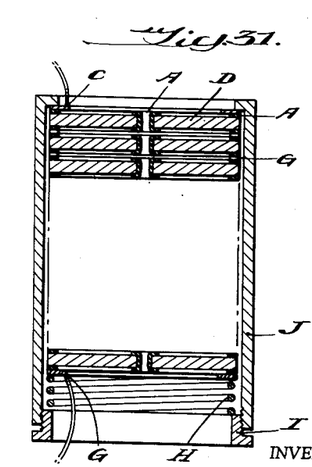
FIG. 31 shows the assembly of a plurality of resistors as shown by FIGS. 29 and 30.

A disc carrying two conductor spirals inverted on its two respective faces is also well adapted to the connection in series of a great number of elements by piling the discs on one another with for instance separating rings which ensure an electrical connection from one disc to the next one. FIGS. 29 and 30 show an example of a film-like resistor carrying inverted spirals B on the two faces of a disc D. The silvered electrodes are shown at A. On the periphery, the electrodes of the two faces are insulated from each other. At the centre they are connected with each other. The film-like conductor spiral on the upper face is shown on FIG. 30 in solid lines and the spiral on the under face is shown in dotted lines. The pitch of the spiral has been very much increased with respect to its real value for the sake of clarity. FIG. 31 shows the arrangement in series of discs such as those of FIGS. 29 and 30. Conductor rings G are interposed between the discs which are packed toward one another by a spring H which is mounted in the insulating frame J and applied against nut I. C designates the current intakes of the system and it will be seen that an analogous arrangement might be obtained with discs soldered together at their periphery, for instance by means of a silver-tin solder.

What I claim is:

1. An electrical resistor which comprises an evacuated glass bulb with a high vacuum therein, a support of an insulating material in said bulb, a film of a conductive material in the form of a narrow strip adhesive to the surface of said support, two electric terminals passing through the ends of said bulb respectively and connected with the respective ends of said strip, a getter in said bulb, a metallic layer formed by said getter on the inner wall of said bulb near one end thereof, and means for electrically insulating said metallic layer from that of said terminals located at said last mentioned end of said tube.

2. An electrical resistor which comprises an evacuated glass bulb with a high vacuum therein, a support of an insulating material in said bulb, a film of a conductive material in the form of a narrow strip adhesive to the surface of said support, two electric terminals passing through the wall of said bulb at the ends thereof respectively and connected with the respective ends of said strip, and metallic screenings on the external wall of said bulb connected with said terminals respectively but insulated from each other.

3. A resistor according to claim 2 further including a varnish coating on the outer surface of said bulb between said screenings.

4. A resistor according to claim 2 further including a layer of "araldite" surrounding the outer surface of said bulb between said screenings.

5. A resistor according to claim 2 further including a layer of silicone surrounding the outer surface of said bulb between said screenings.

6. The method of making a metallic film resistor having an ohmic value within the range of $10^6$ to $10^9$ ohms comprising the steps of evaporating a metallic conductive material in a vacuum in the presence of a support to form a thin film of the conductive material on the support in the form of a narrow strip, placing said support in a bulb with electric terminals connected to the film of conductive material extending through the bulb, placing in said bulb a getter, evacuating the bulb, evaporating the getter to form a metallic layer on the inner wall of the bulb to improve the vacuum, and locating a shield between the film of conductive material and the getter to prevent vapors of said getter from contacting the film of conductive material.

7. A method according to claim 6 in which said conductive material is a metal of the group consisting of iridum and osmium.

8. A method according to claim 6 including the further step of stabilizing the resistor by subjecting the resistor to the effect of a high frequency voltage.

9. An electrical resistor having an ohmic value within the range of $10^6$ to $10^9$ ohms comprising an evacuated glass bulb having a high vacuum therein, a support of insulating material in said bulb, a thin film of a metallic conductive material disposed on said support in a narrow strip, a pair of electric terminals passing through said bulb and connected with the respective ends of the strip, a getter in said bulb, a metallic layer formed by said getter on the inner wall of said bulb and means comprising a shield disposed between said getter and said support for preventing direct contact between vapors of said getter and said film.

References Cited in the file of this patent

UNITED STATES PATENTS

| | | |
|---|---|---|
| 865,367 | Edison | Sept. 10, 1907 |
| 892,332 | Thowless | June 30, 1908 |
| 1,869,544 | Clarry | Aug. 2, 1932 |
| 1,952,717 | Lederer | Mar. 27, 1934 |
| 1,978,165 | Metcalf et al. | Oct. 23, 1934 |
| 2,119,680 | Long | June 7, 1938 |
| 2,132,175 | Machlett | Oct. 4, 1938 |
| 2,337,202 | Jones | Dec. 21, 1943 |
| 2,408,822 | Tanis | Oct. 8, 1946 |
| 2,448,518 | Cashman | Sept. 7, 1948 |
| 2,449,786 | Lockwood et al. | Sept. 21, 1948 |
| 2,486,148 | Glynn et al. | Oct. 25, 1949 |
| 2,552,626 | Fisher et al. | May 15, 1951 |
| 2,586,752 | Weber et al. | Feb. 19, 1952 |
| 2,703,373 | Cummings | Mar. 1, 1955 |
| 2,837,619 | Stein | June 3, 1958 |

FOREIGN PATENTS

| | | |
|---|---|---|
| 101,011 | Australia | Aug. 18, 1936 |
| 570,026 | Great Britain | June 19, 1945 |
| 938,594 | France | Apr. 12, 1948 |
| 672,519 | Great Britain | May 21, 1952 |
| 1,061,274 | France | Apr. 12, 1954 |

OTHER REFERENCES

Electronic Engineering, July 1952, 201–64CP, pages 324 to 327, article entitled Metal Film Resistors, by R. J. Heritage.